US012348090B2

(12) United States Patent
Micucci et al.

(10) Patent No.: US 12,348,090 B2
(45) Date of Patent: Jul. 1, 2025

(54) APPARATUS FOR DEFORMING CONDUCTORS PROTRUDING FROM A SIDE OF A STATOR OR OF A ROTOR OF AN ELECTRIC MACHINE

(71) Applicant: TECNOMATIC S.P.A., Corropoli (IT)

(72) Inventors: Maurilio Micucci, Corropoli (IT); Giuseppe Ranalli, Corropoli (IT); Giovanni Ruggieri, Corropoli (IT); Sergio Tancredi, Corropoli (IT); Francesco Lucchetti, Corropoli (IT)

(73) Assignee: TECNOMATIC S.P.A., Corropoli (IT)

( * ) Notice: Subject to any disclaimer, the term of this patent is extended or adjusted under 35 U.S.C. 154(b) by 882 days.

(21) Appl. No.: 17/276,469

(22) PCT Filed: Sep. 17, 2019

(86) PCT No.: PCT/IB2019/057811
§ 371 (c)(1),
(2) Date: Mar. 15, 2021

(87) PCT Pub. No.: WO2020/058842
PCT Pub. Date: Mar. 26, 2020

(65) Prior Publication Data
US 2022/0037970 A1 Feb. 3, 2022

(30) Foreign Application Priority Data
Sep. 17, 2018 (IT) .......... 102018000008641

(51) Int. Cl.
*H02K 15/062* (2025.01)
*H02K 1/16* (2006.01)
*H02K 3/48* (2006.01)
(52) U.S. Cl.
CPC ............ *H02K 15/062* (2013.01); *H02K 1/16* (2013.01); *H02K 3/48* (2013.01)

(58) Field of Classification Search
CPC .......... H02K 15/062; H02K 1/16; H02K 3/48; H02K 15/0428; H02K 15/0087
See application file for complete search history.

(56) References Cited

U.S. PATENT DOCUMENTS

2001/0013167 A1* 8/2001 Maeda ................... H02K 15/14
29/596
2004/0007931 A1* 1/2004 Gorohata ................ H02K 3/12
310/201

(Continued)

FOREIGN PATENT DOCUMENTS

JP 2008061291 3/2008
WO 2012014233 2/2012

OTHER PUBLICATIONS

International Search Report, issued in PCT/IB2019/057811, mailed Nov. 14, 2019.

(Continued)

*Primary Examiner* — Aneeta Yodichkas
*Assistant Examiner* — Jose K Abraham
(74) *Attorney, Agent, or Firm* — Ferguson Case Orr Paterson

(57) ABSTRACT

An apparatus (200) for deforming conductors of at least one winding assembly (100), protruding from a side of a stator or of a rotor (114) of an electric machine. The at least one winding assembly (100) comprises a plurality of basic conductors (102) comprising at least one leg inserted into cavities (115) of stator or rotor (114), each having at least one respective free or terminal end (108, 110). The apparatus (200) comprises at least one twisting matrix (202, 203) adapted to rotate about an axis (X), comprising at least one gripping element (204) adapted to grip at least one free end (108, 110) and adapted to be moved in radial direction with respect to said axis (X). The apparatus comprises at least one guide (206, 207) adapted to guide the at least one gripping (Continued)

A-A element (204) along the radial direction with respect to the axis (X); and a radial actuator (208), adapted to put in motion the at least one gripping element (204) along the radial direction with respect to the axis (X).

15 Claims, 11 Drawing Sheets

(56) References Cited

U.S. PATENT DOCUMENTS

| | | | | |
|---|---|---|---|---|
| 2004/0061401 | A1* | 4/2004 | Gorohata | H02K 15/0428 310/208 |
| 2013/0104381 | A1* | 5/2013 | Guercioni | H02K 15/0081 29/559 |
| 2013/0115029 | A1* | 5/2013 | Guercioni | H02K 15/0421 414/222.04 |
| 2014/0237811 | A1* | 8/2014 | Guercioni | H02K 15/0421 29/736 |
| 2015/0022038 | A1* | 1/2015 | Guercioni | H02K 15/0428 310/201 |
| 2015/0180319 | A1* | 6/2015 | Kimura | H02K 15/0087 29/596 |
| 2018/0212496 | A1* | 7/2018 | Gohs | H02K 15/024 |
| 2020/0328661 | A1* | 10/2020 | Falkner | H02K 15/24 |
| 2020/0350806 | A1* | 11/2020 | Falkner | H02K 15/36 |
| 2022/0037970 | A1* | 2/2022 | Micucci | H02K 15/36 |

OTHER PUBLICATIONS

Written Opinion, issued in PCT/IB2019/057811, mailed Nov. 14, 2019.

* cited by examiner

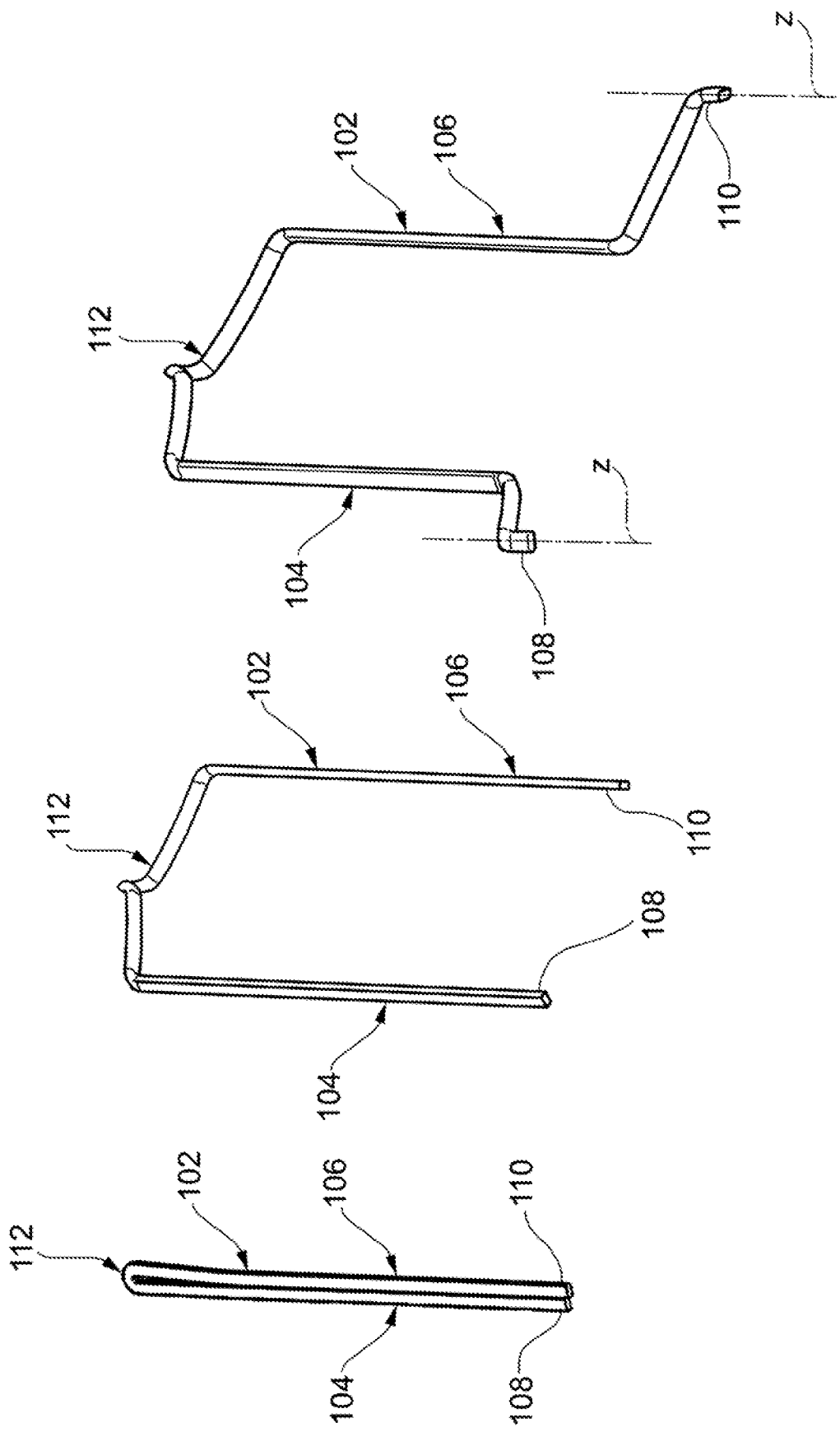

A-A

B-B

APPARATUS FOR DEFORMING CONDUCTORS PROTRUDING FROM A SIDE OF A STATOR OR OF A ROTOR OF AN ELECTRIC MACHINE

FIELD OF APPLICATION

The present invention relates to an apparatus and a process for deforming conductors protruding from a side of a stator or of a rotor of an electric machine. In particular, the present invention relates to the twisting process of conductor ends on welding side.

BACKGROUND ART

It is known to provide winding sets of electric bar conductors for stators or rotors of electric machines, such as generators or electric motors.

In this type of winding, the electric bar conductors form an element of the winding, which is shaped in a sequence of steps, and inserted together with others into a stator or rotor so that the ends of such elements can be welded together to form a predetermined winding pattern, also referred to as an electric bar winding.

A particular type of electric bar conductors is often referred to in technical jargon as "hairpins", because of their initial shape with hairpins for hair. Hereafter, the term "hairpin" will be used for easy reference.

The hairpins, which comprise two free ends that will hereinafter also be indicated with the term "terminals", are assembled on a stator or a rotor of an electric machine so as to form a circular set, which in general is defined by the term "winding set". Therefore, a bar winding may comprise one or more sets, mutually concentric, in which the hairpins are electrically connected to one another according to a predetermined pattern, according to the type of operation required.

A stator or rotor core of a radial magnetic flux electric machine is essentially a ring having two flat faces and two cylindrical surfaces, having generators perpendicular to the two flat faces and parallel to the rotation axis of the rotor of the electric machine. The radial, circumferential and axial directions hereinafter refer the latter axis, unless otherwise specified. One of the two cylindrical surfaces is adjacent, at least in part, to the air gap of the electric machine, to which said stator or rotor belong, and defines a set of slots in which the straight parts of the winding are housed. The two flat surfaces are divided into insertion surface or side and the surface or side opposite to the insertion side. The parts of the winding which protrude from said core are referred to as headers. The ends of the free portions of the conductors belong to the header protruding from the side opposite to the insertion head, most of which are subject to welding. If protruding portions connected in a bridge-like manner are present in the winding, they belong to the header protruding from insertion side. The portions protruding from the insertion side, either free or connected in a bridge-like manner, are indicated below as portions from insertion side.

The stator or rotor core region between a slot and an adjacent one is referred to as a tooth. The number of teeth is equal to the number of slots. The connecting part of the teeth of the core, which also defines a portion of each slot and is located with respect to it on the side opposite to the slot opening on the air gap of the machine, is referred to as a yoke.

The slot can be divided into a matrix of positions in each of which a leg of a rod conductor can be placed. The conductors housed in the same radial position of the slots define a so-called winding layer.

In other words, the term "stratum" or "layer" refers to an annular array of terminals or free ends: each set consists of two layers, an inner layer and an outer layer. The method and apparatus of the present invention allow the deformation of the conductors protruding from the welding side or sides so as to modify the diameters and the number of the layers defined by the free ends of said conductors, with respect to the layers defined by their rectilinear parts (legs) housed in the slot, preferably by using a single device.

With reference to the cross section of the hairpins, this may be rectangular, circular or square. In particular, a rectangular or square section means a substantially rectangular or square section with rounded edges. There are also other types of cross sections, e.g. trapezoidal-shaped, in which the edges, as in the previous rectangular section, are rounded. The cross sections of the hairpins are known per se to those skilled in the art, thus they will not be described further.

A known hairpin forming process substantially provides three main steps: a pre-forming, a twisting on insertion side and a twisting on welding side.

Pre-forming provides the initial bending of a straight bar, by means of which a "U" or "P" shape is obtained. An example of forming method and respective equipment is described in U.S. Pat. No. 7,480,987.

In this first step, the hairpin comprises two legs side-by-side, connected at one end, which may have the same length ("U"-shape) or different length ("P"-shape). Each leg of the hairpin thus has a free end, opposite to the connected end. Each free end is provided with an end face which results from the cutting of the conductor used to form the hairpin and therefore is substantially a face transversal to the conductor itself.

An example of a pre-formed hairpin is shown in FIG. 1, in which a flattened U-shaped hairpin 102 is shown, having two legs 104, 106 and a connecting portion 112.

The pre-formed hairpin is then subjected to the so-called twisting from insertion side, step through which the legs of the hairpin are substantially spread with respect to each other. In this regard, a twisting device from insertion side is used, which provides concentric rollers, which can mutually rotate. Pockets or cavities with development substantially parallel to the rotation axis of the rollers, in which the legs of the hairpins can be inserted, are provided on each guide roller. The hairpin is inserted with one leg into a cavity of a first roller and with the other leg into the cavity of a second roller adjacent to the radial direction.

The relative rotation between the two concentric rollers causes a spreading of the connecting portion, which will be substantially equal to the angular distance between the two stator or rotor slots which house the hairpin when it is mounted on said stator or rotor of an electric machine. FIG. 2 shows an example of a configuration of a hairpin after twisting from insertion side. In the figure, it can be noted that the connection portion 112 has at its top a zone in which the cross section of the conductor is subjected to a 180° rotation with respect to the medial surface of the hairpin (surface which passes inside the hairpin and includes the two legs).

As the twisting process on insertion side is known per se to those skilled in the art (e.g. from the U.S. Pat. No. 7,805,825) and is not the specific subject of the present description, it will not be described further. The twisting from insertion side is applied to obtain a winding assembly before it is inserted into a stator.

The hairpin may also be obtained by stamping, i.e. from a straight conductor pressed against a contrast of a "punch and die" type system. The cross section of a stamped hairpin does not rotate substantially with respect to the median surface of the hairpin There are other types of hairpins in the prior art: the so-called "I-pins", "W-shaped conductors" and "stranded hairpins".

In the reminder of the present description, the basic conductor is the conductor ready to be inserted into a rotor or stator.

The winding assembly may comprise, for example, a set of basic conductors, which have the connecting portions on one side and the legs on the other side, in particular the free or terminal ends, mutually parallel so that they can be inserted, for example, into corresponding slots in a stator core.

In other configurations, there may be a winding which does not have connecting portions, or there may be windings with connecting portions and free ends on the same side. The side of the stator or rotor core through which the legs of the basic conductors are inserted is referred to as a "insertion side" or "insertion face". Whereas, the side opposite to the insertion side, through which the legs of the basic conductors protrude, is referred to as a "welding side" or "connection side" or "welding face" or "outlet face".

Typically, the free ends of the legs of the basic conductors protruding, for example, from the stator core may be subjected to a second twisting, referred to as a "twisting from welding side", performed with a corresponding device. FIG. 3 shows an example of a basic conductor after having been subjected to a twisting process from welding side.

The main purpose of twisting from welding side is to bring together two free ends of legs, initially on different circumferences but on two radial directions mutually spaced apart.

The approach between the ends is, for example, achieved by inserting each layer of free ends of the legs of the basic elements into seats or slots of a corresponding twisting ring. The mutually concentric twisting rings, by rotating one against the other, determine such an approach of the ends.

For example, by using as unit for the distance between the portions housed in the slot of two ends to be approached, the number of slots between said portions, taking a distance of three slots, the approach can be achieved by rotating two slots one of the rings in one direction and one slot the other ring in the opposite direction.

Thus, the basic conductors comprise a first leg portion which remains within the corresponding slot, e.g. of the stator, a portion inclined with respect to the main axis of the stator core, in the rotation direction of the respective ring, and an end substantially parallel to the main axis of the stator core, but in a different radial direction with respect to the first leg portion.

An example of a method and a twisting device on welding side is described, for example, in U.S. Pat. No. 8,215,000. In particular, a twisting device is described which allows to obtain a differentiated twisting of the ends inserted in the same ring. Differentiated twisting is achieved, for example, by providing a ring portion, comprising a slot, movable along the circumference of the ring itself. The mobility implies that, once the ring has been rotated, the end of the basic conductor inserted in the slot of the movable ring has a delay in twisting, until the movable portion abuts on the remaining part of the ring structure.

In any case, the welding process of the ends of the basic conductors is a very delicate step of the process by means of which the bar windings are obtained since the basic conductors are very close to one another.

Indeed, the twisting devices on welding side according to the prior art, although widely appreciated, are not free from drawbacks.

Firstly, although the proximity of the ends of the basic elements is a desired feature, it reflects in a complication of the welding process. Indeed, for example if the welding must take place only between two ends, this step must be very precise to prevent involving the immediately contiguous ends.

Furthermore, due to the proximity of the ends, electrical phenomena, such as electric arcs between pairs of terminals, are possible, albeit in isolated cases.

Again, using a twisting device according to the known art, if the number of conductors housed in each stator (or rotor) slot is high, there is a misalignment between the conductors which are close to one another, and the respective cavities of the twisting device which instead are separated by radially spaced walls.

Furthermore, the radial proximity between the legs prevents the insertion of insulating rings between layers of the same set.

INVENTION OVERVIEW

The need is therefore felt to solve the drawbacks and limitations mentioned above with reference to the prior art.

Therefore, the need is felt to provide an apparatus and a process which allow the easier welding of the free ends of the basic conductors.

Furthermore, the need is felt for an apparatus which can be integrated into the apparatus which is normally used for twisting on welding side of the winding assemblies.

Furthermore, the need is felt to provide an apparatus that makes it easier to weld a given assembly of free ends.

Furthermore, the need is felt for an apparatus and a process which allow the automation of the bending of the free ends in order to facilitate the subsequent step of welding.

Furthermore, the need is felt for an apparatus and a process which allow to align the slots of the twisting ring with the corresponding conductors protruding straight from the stator, distancing the terminals to facilitate the insertion of the twisting rings in the grooves, if the number of conductors housed in the grooves of a rotor or stator is high.

Furthermore, the need is felt for an apparatus and a process which allows the automatic insertion of, or which facilitates the manual insertion of, insulating rings between layers of the same set, either before or after the bending of the protruding conductors.

Such requirements are met by an apparatus according to claim 1 and by a process according to claim 15.

DESCRIPTION OF THE DRAWINGS

Further features and advantages of the present invention will become more comprehensible from the following description of preferred embodiments given by way of non-limiting examples, in which:

FIG. 1 diagrammatically shows a perspective view of a preformed flattened U-shaped hairpin according to the prior art;

FIG. 2 diagrammatically shows a perspective view of a hairpin according to the prior art;

FIG. 3 diagrammatically shows a perspective view of the hairpin in FIG. 2 after the twisting process on welding side according to the prior art;

Figure 4:
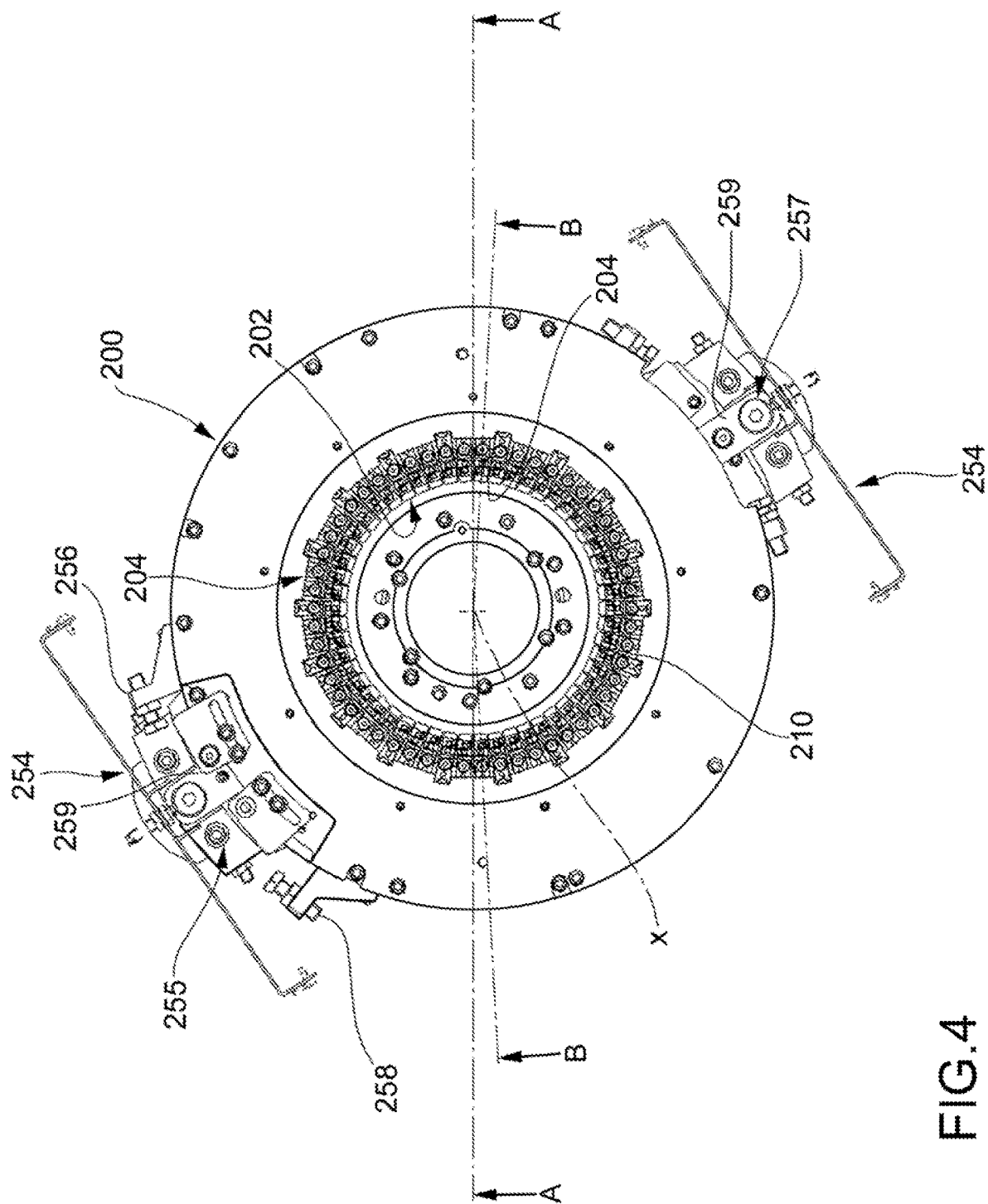
FIG. 4 diagrammatically shows a first embodiment of an apparatus according to the present invention.

It is worth noting that elements of different embodiments described hereinafter may be combined together to provide further embodiments without restrictions respecting the technical concept of the invention, as those skilled in the art will effortlessly understand from the following description and disclosure.

The present description also relates to the prior art for its implementation, with regard to the detail features which are not described, such as, for example, elements of minor importance usually used in the prior art in solutions of the same type.

When an element is introduced in the description or the claims is always understood that there may be "at least one" or "one or more", unless otherwise specified.

When a list of elements or features are listed in this description it is understood that the invention according to the present description "comprises" or alternatively "consists of" such elements.

Similar or equivalent elements in the accompanying figures are indicated by means of the same reference numerals.

For the purposes of the present description, "flat" or "square" bar conductor means a bar conductor having four substantially flat sides, each joined to adjacent sides and forming typically rounded edges. Therefore, the words "flat" or "square" or equivalent words used to describe the cross section of a bar conductor are used in a general sense and must not be interpreted to exclude the fact that such bar conductors have significantly rounded corners which join the substantially flat sides. The expression "flat conductor" means that the conductor has two opposite sides, the distance of which is greater than the distance between the other two opposite sides. For the purposes of the present description, the term "rectangular conductor" means generalization of flat conductor and square conductor, being the square conductor a special case of rectangular conductor, in which the four sides have the same size.

For the purposes of the present description, the expression "non-circular conductor" or "non-circular hairpin conductor" or "non-circular hairpin" must be understood as designating a conductor having any polygonal shape section, and therefore as a generalization of "rectangular conductor". For example, conductors with a rectangular, triangular, pentagonal, hexagonal section, either regular or irregular, are included in this expression. It also encompassed by the conductors with continuous closed curve sections, such as an ellipse. The bar conductors according to the present description may also be those having less usual shapes, as described for example in the figures of patent application U.S. Pat. No. 7,622,843B2. Furthermore, the apparatus and method of the present description comprise the use of conductive bars in a variously alternating manner, e.g. mainly of a type with some example of one or more different types.

For the purposes of the present description, a seat or slot in a member may be defined both by a recess or a depression completely surrounded by such a member, by from a cavity in said member in which one or more open sides of the cavity are adapted to be effectively closed by a surface or a wall of an adjacent component. In particular, a slot can also be a blind hole or a through hole in a member.

For the purposes of the present description, the expressions "radial" or "circumferential" or other similar expressions defined with respect to a direction or along an axis are referring to a circumference lying in a plane orthogonal to such direction or axis and which has the center on said direction or axis. Furthermore, for the purposes of the present description, the expression "angularly spaced" (or other similar expressions) defined with respect to a direction or axis must be referred to the angle between two radii of a circle lying on a plane orthogonal to such direction or axis and which has the center on said direction or axis.

DETAILED DESCRIPTION

Figure 5:
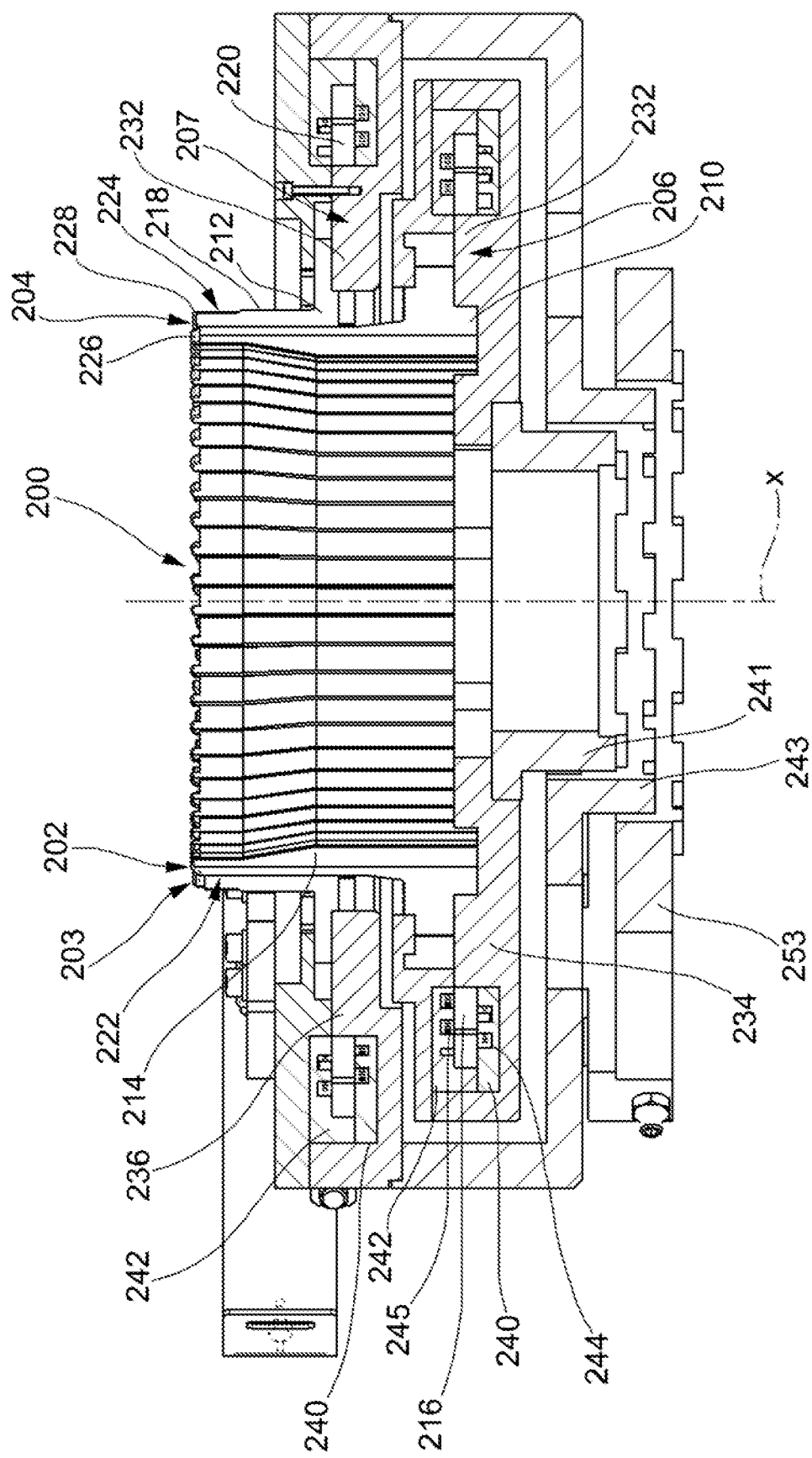
FIG. 5 diagrammatically shows a section view from the front of the apparatus of FIG. 4 taken along the section plane A-A.

FIG. 5 shows a possible embodiment according to the present invention of an apparatus 200 for deforming conductors of at least one winding assembly 100, protruding from a side of a stator or of a rotor 114 of an electric machine.

As known, the winding assembly 100 comprises a plurality of basic conductors 102 comprising at least one leg 104, 106 inserted into cavities 115 of stator or rotor 114, each having at least one free or terminal end 108, 110. The cavities 115 may have a radial opening facing either inwards or outwards.

The apparatus 200 may comprise centering means for said stator or rotor 114, with respect to an axis X of the apparatus 200. The centering means allow to make the axis X of the apparatus 200 coincide with the axis of the stator or rotor 114. The centering means also allow to make the axis X of the apparatus 200 coincide with the axis Y of the winding assembly 100.

The apparatus 200 according to the present invention comprises at least one twisting matrix 202, 203 arranged with at least one gripping element 204 adapted to grip at least one free end 108, 110. The gripping element 204 may comprise a seat or slot 226, 228 having an extension substantially parallel to the direction of axis X.

The term "grip" indicates the fact that the gripping element, once the free end has been inserted into the seat or slot 226, 228, constitutes a constraint on the free end at least with respect to movements in directions perpendicular to that of insertion. In this case, in given moving conditions of the gripping element with at least one free end inserted, there may be a relative sliding in a direction parallel to the insertion direction.

The at least one twisting matrix 202, 203 adapted to rotate around the axis X of the apparatus 200.

At least one of the gripping elements 204 of at least one twisting matrix 202, 203 is adapted to be actuated in radial direction with respect to axis X. In this regard, the apparatus comprises at least one guide 206, 207 adapted to guide the at least one gripping element 204 along the radial direction with respect to axis X. The apparatus 200 further comprises a radial actuator 208, adapted to put in motion the at least one gripping element 204 along the radial direction with respect to axis X.

The movement of the gripping element 204, which engages at least one free end or terminal 108, 110, is adapted to cause a deformation of the leg portion of the conductor which protrudes from the stator or rotor cavity 115, in manners which will be apparent below in the present description.

According to a possible embodiment of the present invention, all the gripping elements 204 of at least one twisting matrix 202, 203 are adapted to be moved in a radial direction with respect to axis X.

In alternative embodiments, some of the gripping elements 204 belonging to a twisting matrix 202, 203 may be adapted to be moved in radial direction with respect to axis X, e.g. in groups.

According to possible embodiments of the present invention, at least one movable gripping element 204 may be moved in radial direction away and/or towards axis X. It is then possible to deform the leg of the conductor so that the final position of its end is either closer to axis X than the initial position before deformation or further away.

According to a possible embodiment of the present invention, at least one gripping element 204 is adapted to be moved in axial direction along an axis parallel to axis X approaching the stator or rotor 114. In particular, the movement may be of a corresponding type, and for example provide that the insert 204 is moved and that the rotor or stator are fixed or vice versa.

The gripping element 204 can be fitted on the insert 210, 212 having an "L"-shape on a cross plane comprising axis X. The insert 210, 212 may comprise: a first portion 214, 218 substantially parallel to axis X, and a second portion 216, 220 substantially perpendicular to axis X. The gripping element 204 can therefore be prepared at the upper ends 222, 224 of the first portions 214, 218, which face the winding unit 100 in use.

Figure 6:
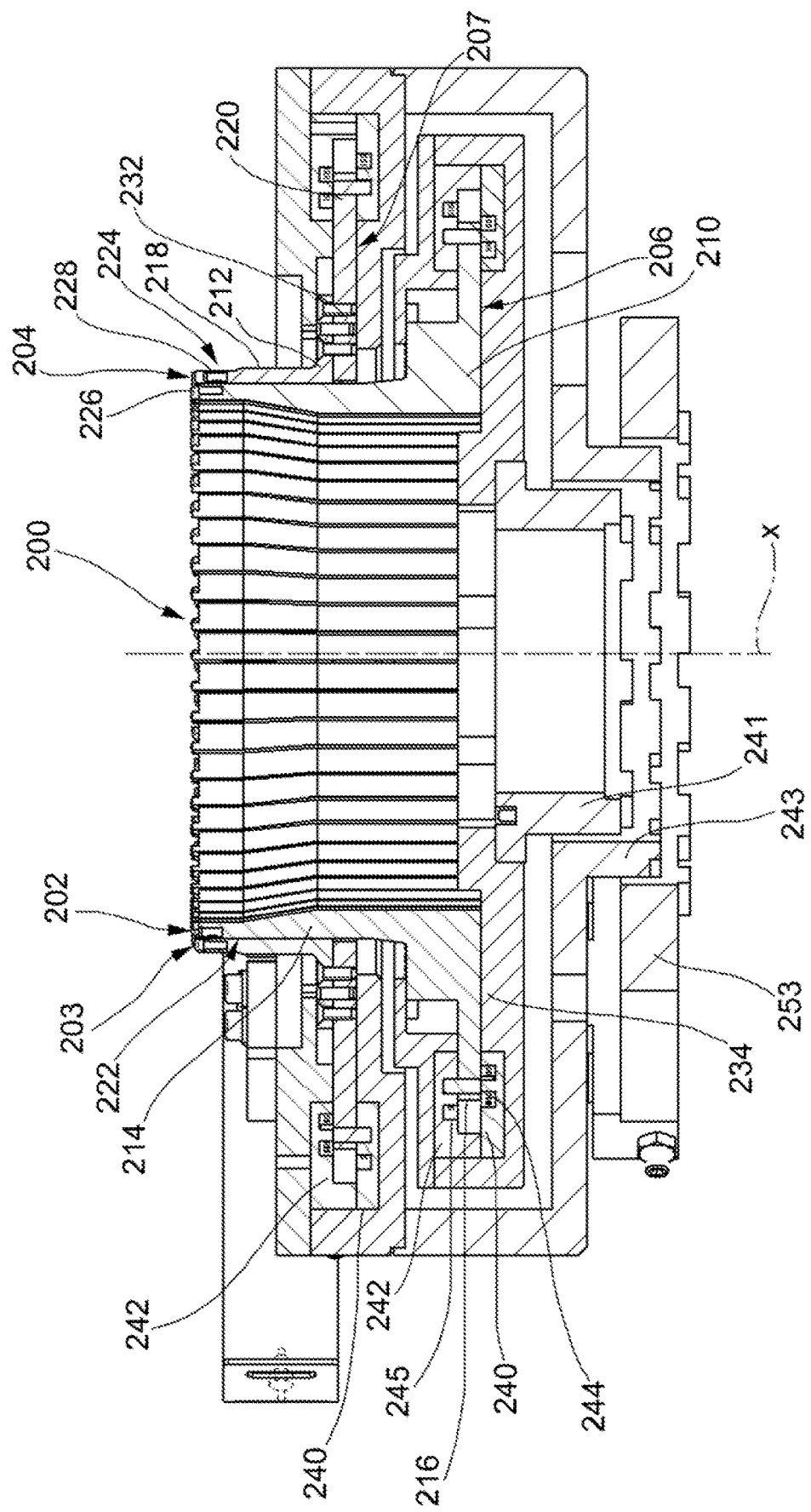
FIG. 6 diagrammatically shows a section view from the front of the apparatus of FIG. 4 taken along the section plane B-B.

In the embodiment shown in FIGS. 5 and 6, the apparatus comprises an inner twisting matrix 202 and an outer twisting matrix 203, in which both are arranged with at least one gripping element 204 moving in radial direction with respect to axis X. In particular, both twisting matrices 202, 203 consist of gripping elements 204 which move in a radial direction with respect to axis X. Inner twisting matrix 202 and outer twisting matrix 203 mean the reciprocal position of the two twisting matrices 202, 203, in at least one of the configurations they may take. More generally, for any configuration taken by the two twisting matrices, an inner matrix gripping element is always closer to axis X than at least one outer matrix gripping element. In this embodiment, the inner twisting matrix 202 comprises inner inserts 210 and the outer twisting matrix 203 comprises outer inserts 212.

In a possible embodiment of the present invention, e.g. in a starting position, the inner insert 210 and the outer insert 212 may be mutually aligned along a radial direction so that:
the first portions 214, 218 are arranged parallel to each other, with the first portion 218 of the outer insert 212 at a distance from axis X, and
the second portions 216, 220 are parallel to each other and superimposed so that the second portion of the inner element 216, in use, is distal with respect to the winding assembly 100.

Figure 15:
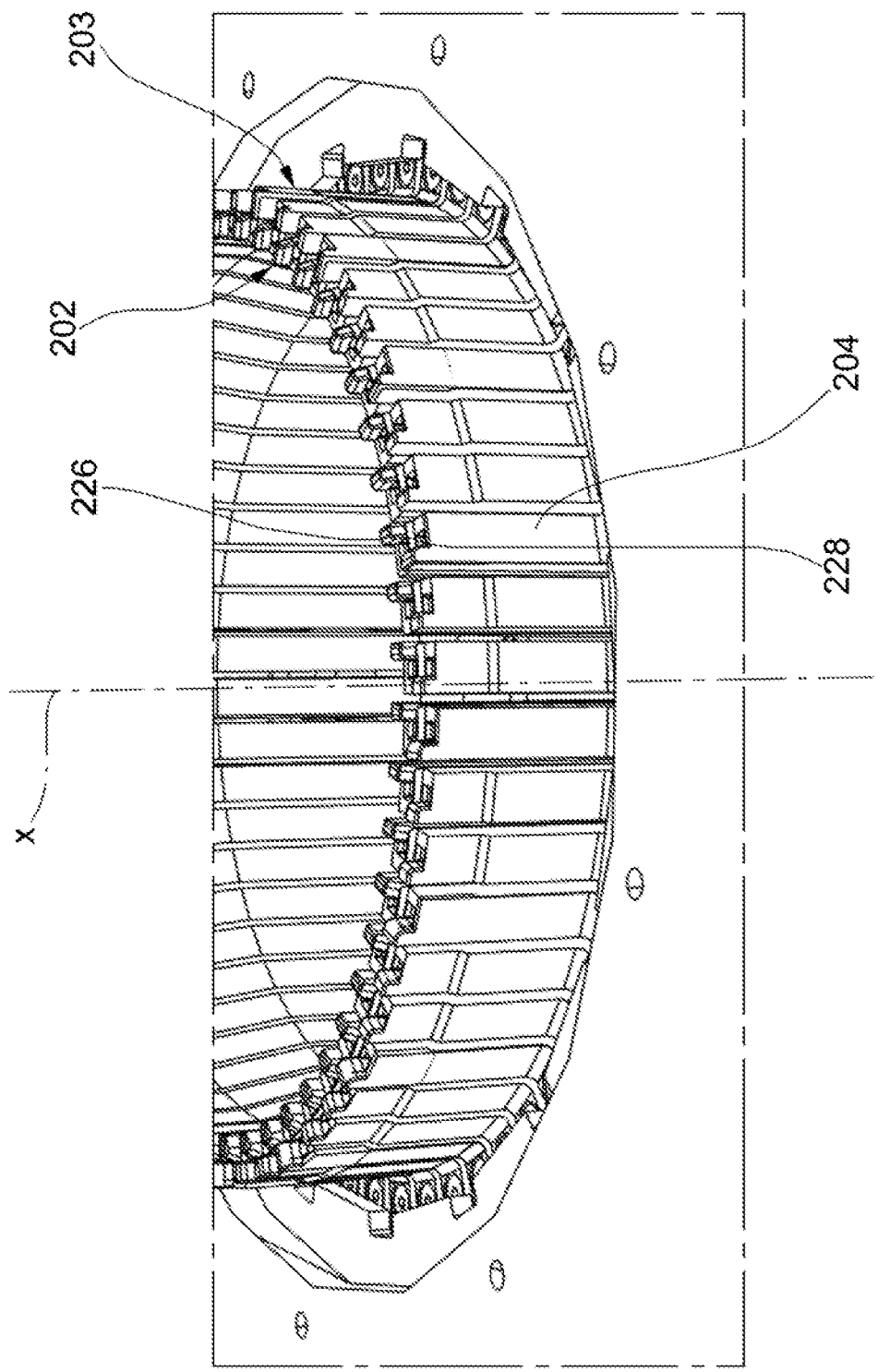
FIG. 15 diagrammatically shows a perspective view from the top of a portion of the apparatus according to the present invention.

Advantageously, as can be seen in the example in FIG. 15, the seats 226, 228 which are arranged respectively on the inner insert 210 and on the outer insert 212 can be aligned along a radial direction, and have development substantially parallel to the direction of axis X.

The radial alignment between one matrix insert and another matrix insert can also be achieved either at the end of the twisting or in other intermediate operating conditions.

According to alternative embodiments, the apparatus 200 may comprise more than two twisting rings, e.g. four, in which at least two twisting rings may be of the type with inserts 210, 212 radially movable with respect to the direction of axis X. In a possible embodiment, all the twisting rings of the apparatus may be of the type with inserts 210, 212 radially movable with respect to the direction of the axis X.

Figure 7:
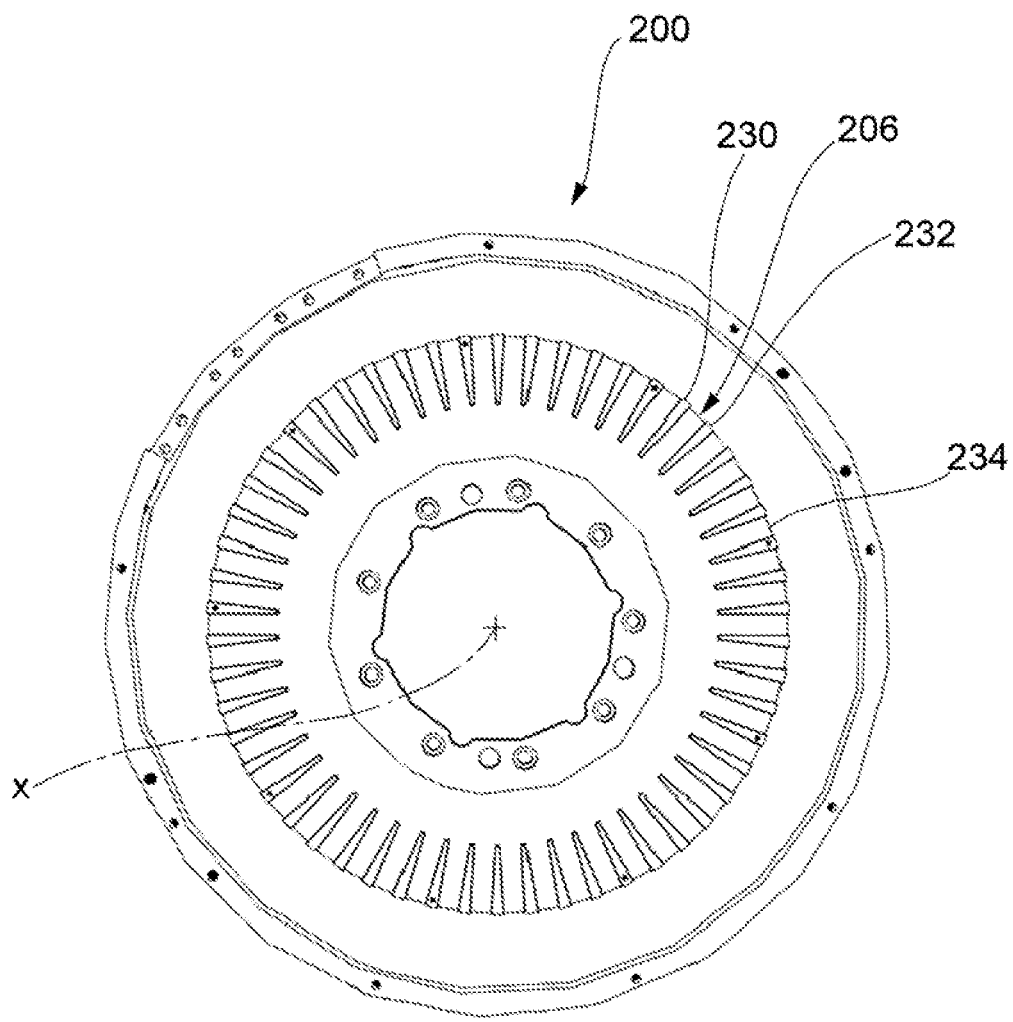
FIG. 7 diagrammatically shows a view from the top of a component of the apparatus in FIG. 4.

The guide 206, 207 for at least one insert 210, 212, may comprise radially extending side abutments 230, 232, adapted to guide the movement by means of a shape coupling with inserts 210, 212, e.g. with second portions 216, 220. FIG. 7 shows an example of a possible embodiment of the guide 206. The guides 206 are integral with a guide plate which transmits a rotational motion to the abutments 230, 232, which is transmitted by the abutments 230, 232 to the corresponding inserts. The guide plate may also transmit the axial movement to the inserts guided by the guides themselves.

The guide 206 for inner inserts 210 and the guide 207 for outer inserts 212 may comprise respective plates 234, 236 on which the abutments 230, 232 are provided. With reference to FIG. 7, which shows the guide 206 for inner inserts 210, it can be noted that each abutment 230, 232 may have a substantially triangular section according to a plane perpendicular to axis X, so that the area in which the second portion 216 of the inner insert 210 can slide is substantially a rectangular track. Although the guide 207 for the outer inserts is not shown with a view similar to that in FIG. 7, it can substantially be obtained in the same manner.

In FIG. 7, although only the two abutments which guide one of the inner inserts 210 is indicated with reference numerals 230, 232, each inner insert 210 can be guided by the respective side abutments 230, 232. In particular, mutually adjacent inserts 210 can be separated by an abutment 230, 232, which is thus shared.

With particular reference to FIGS. 5 and 6, which show two similar sections of the apparatus of the present invention, it can be noted that the abutment 232 is visible in FIG. 5. While in FIG. 6, in which the plane of section B-B is parallel to but distant from the plane of section A-A in FIG. 5, the abutment 232 cannot be seen, but it is possible to note the second portion 216, 220 of the insert 210, 212 which is guided by the abutments 230, 232.

It will now describe with reference to FIGS. 5-8 the radial actuator 208 of the apparatus 200 shown in FIGS. 4-13 in detail.

According to a possible embodiment of the present invention, the radial actuator 208 comprises a cam mechanism 238. In the embodiment shown in FIGS. 4-11, the apparatus is provided with a cam mechanism 238 for moving the inner inserts 210 and with a second cam mechanism 238 for moving the outer inserts 212.

A cam mechanism 238 may comprise at least one guide disc 240, 242, perpendicular to axis X, and provided with at least one shaped slit 244, 245. The cam mechanism 238 may further comprise at least one pin 246, 248 protruding in a direction parallel to axis X from the second portion 216, 220 of insert 210, 212.

Figure 8:
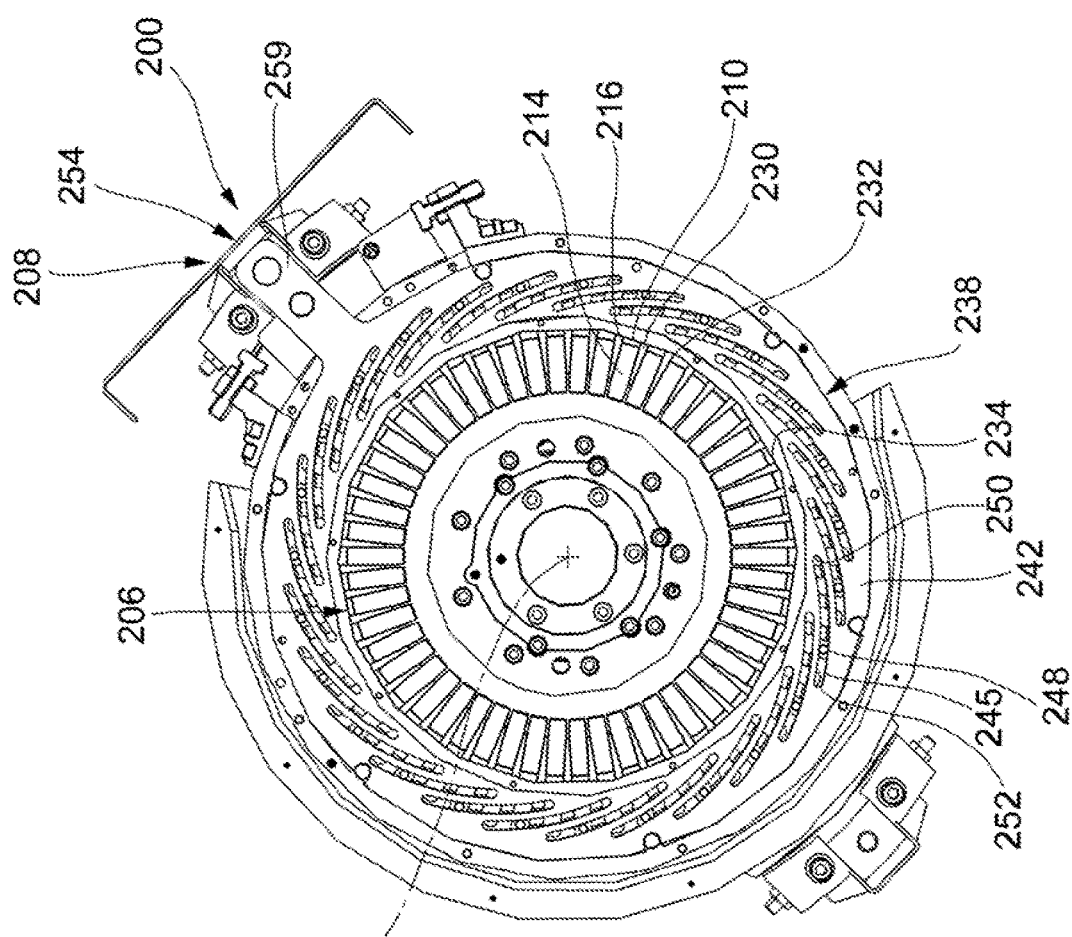
FIG. 8 diagrammatically shows a view from the top of the apparatus in FIG. 4, with some components removed.
Figure 9:
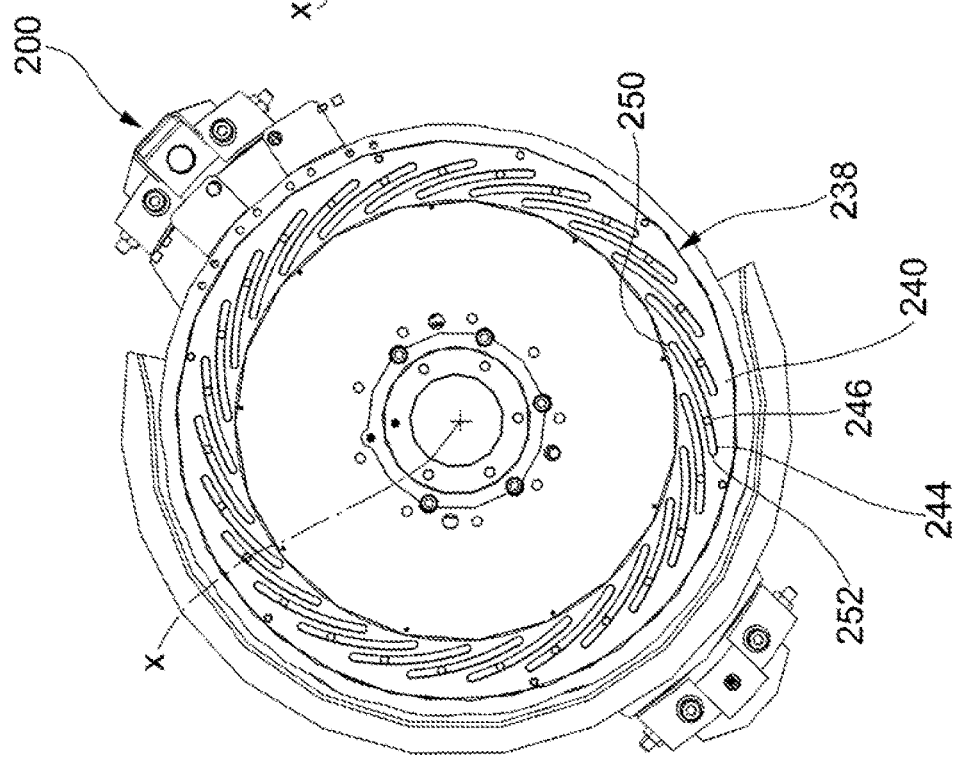
FIG. 9 diagrammatically shows a view from the top of the apparatus in FIG. 4, with further components removed compared to FIG. 8.

With reference to FIG. 8 or 9, the slit 244 has a first end 250 placed at a first distance with respect to axis X, and a second end 252 placed at a second distance with respect to axis X greater than the first distance. Furthermore, first and second ends 250, 252 are on two different radii with respect to axis X.

According to a possible embodiment, shown in the accompanying figures, the cam mechanism 238 may include a lower guide disc 240 and an upper guide disc 242, lying perpendicular to the axis X and arranged in mutually parallel positions, arranged with at least one shaped slit 244. The cam mechanism 238 may further comprise at least one pin 246, 248 protruding in a direction parallel to axis X from the second portion 216, 220 of insert 210, 212.

As shown in the examples in FIGS. 8 and 9, the shaped slits 244 may be distributed equidistantly in a circular set.

According to a possible embodiment of the present invention, e.g. in the embodiment shown in FIGS. 5 and 6, in the case of an L-shaped insert, the second portion 216, 220 of each insert 210, 212 is at least partially contained between a lower guide disc 240 and an upper guide disc 242, so that its pin 246, 248, is contained in a shaped slit 244, 245.

In a possible embodiment, each insert 210, 212 comprises a pin so that a pin 246 protrudes in a direction and the adjacent pin 248 protrudes in the opposite direction in a direction parallel to axis X. In other words, each pin protrudes in direction opposite to the adjacent pins. The lower pin 246 is housed in a shaped slit 244 placed on the lower guide disc 240, while the upper pin 248 is housed in a shaped slit 245 on the upper guide disc 242. With this arrangement it is advantageously possible to guide the movement of inserts 210, 212 very close to one another which, on the contrary, would be difficult if the slits 244 were placed on a single guide disc, because they would be too close to one another.

According to a possible alternative embodiment, an insert can be provided with several pins, e.g. two, adapted to slide into the relevant slits. Furthermore, an insert can be provided with multiple pins adapted to slide inside the same slit.

In the embodiment shown in the accompanying figures, the inner inserts 210 and the outer inserts 212 are provided with a cam mechanism 238, each with an upper guide disc 242 and a lower guide disc 240.

As previously mentioned, alternative embodiments are possible in which two twisting rings are provided, which may be arranged with radially movable inserts and their respective cam mechanisms.

In another alternative embodiment, only one portion of each twisting matrix is prepared with radially movable inserts. In this case, only one portion of the ends (e.g. the portions which are on one layer) can be deformed in radial direction.

According to a possible embodiment of the present invention, e.g. only one insert can be radially movable. In a further embodiment, at least one insert may move in radial direction, irrespective of the radial movement of the other inserts. In this case, a cam mechanism can be set up to move only one insert.

Figure 14:
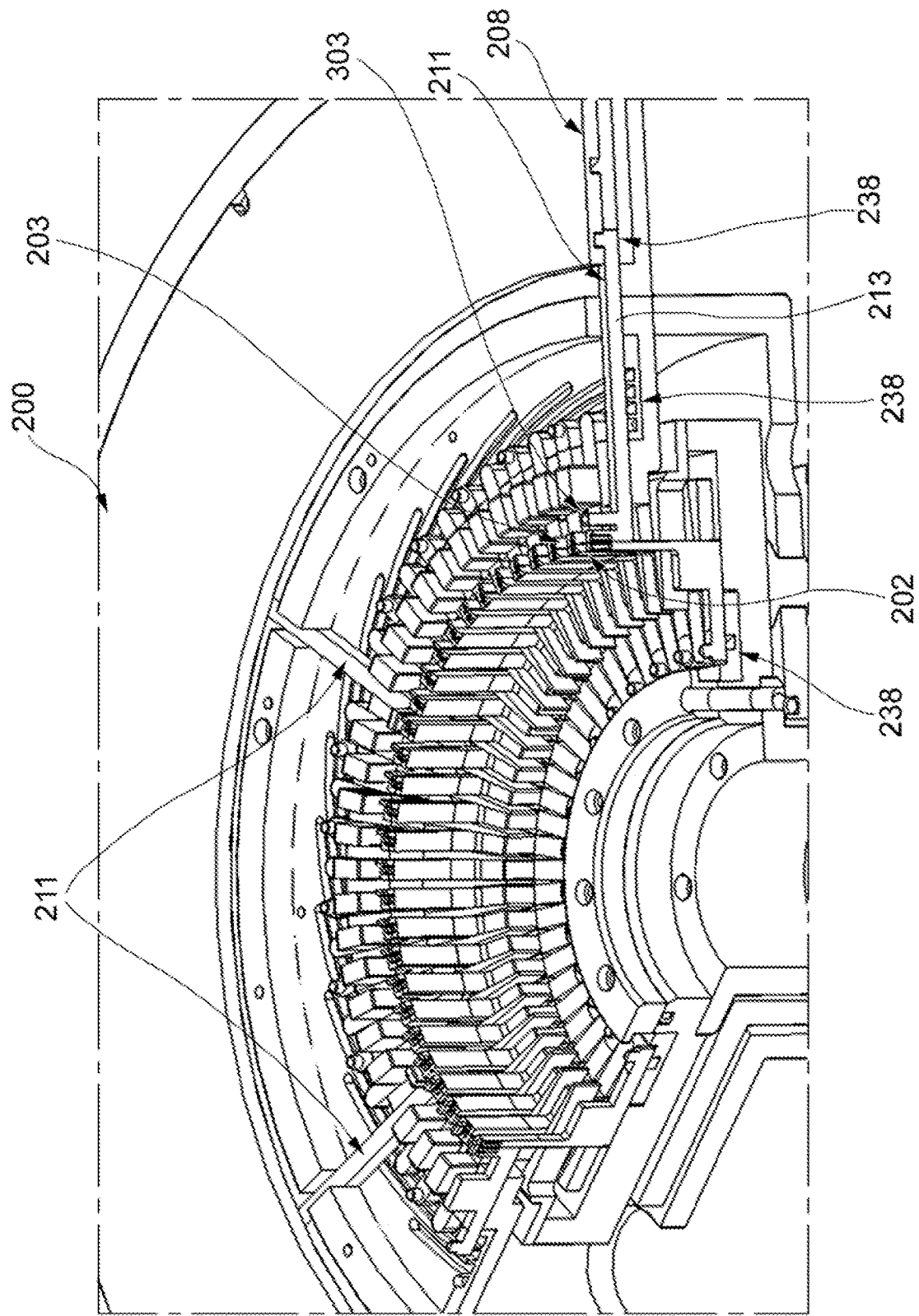
FIG. 14 is a perspective view of the apparatus according to the present invention.

In a possible embodiment shown in FIG. 14, the apparatus 200 is provided for the differentiated bending of at least one leg 104, 106 of the same layer. The differentiated bending can be obtained by setting up the apparatus with at least one insert 211 which can be operated independently, capable of moving on a trajectory which cannot be superimposed on that of the inserts which bend the other conductors of the same layer, because it can be operated with at least one of the following elements dedicated exclusively to it: shaped slit, guide disc, guide plate with abutments.

The corresponding independent insert 211 may, for example, belong to a twisting matrix containing other inserts which can be moved differently by means of specially shaped slits within the same guide disc. Or, as in the case shown in FIG. 14, the independent inserts are actuated by a guide disc with shaped slits and a plate of guides dedicated thereto.

The use of independent inserts can make the heads shaped by the device of the present invention recognizable compared to those bent by the twisting devices of the prior art. The array of straight conductors which protrude, before twisting, from the same side and from the same position as the stator or rotor slots are bent by the twisting devices of the prior art in a known manner so that their final faces are substantially arranged along a circumference when viewed from the stator or rotor axis. The device of the present invention can bend the same conductors so that their cutting faces are arranged at different distances from the twisting axis. Furthermore, in electrical winding diagrams, it often happens that the conductors of the same layer, e.g. the outermost layer, must be electrically connected. Such a connection, which is normally established by means of a third element, an electrical jumper, may be obtained as a direct connection between the two ends to be connected by means of the device of the present invention. In particular, by virtue of the ability of the independent insert to counter-rotate and have a different radial excursion compared to the inserts acting on conductors belonging to the same layer as that taken from the independent gripping element, a pair of basic conductors with portions housed in the slot belonging to the same layer can be brought together. This allows to weld the ends of said pair directly and to establish an electric connection free from intermediate elements. This is possible because the independent insert deforms the end it grips with an inclination opposite with respect to that of most of the ends of the layer to which it belongs. The elimination of a third electric connection element is a significant advantage for the productivity of an automatic winding production system.

At this point, it is convenient to expand the definition of twisting matrix. The twisting matrix is the set of gripping elements and guiding abutments which cannot change their reciprocal angular distance with respect to an axis X'. For example, one of the gripping elements guided by a guide plate, when housed cannot change its angular distance from another gripping element of the same matrix or from the guide abutments, because such an angular distance refers to an axis X'. The totality of the gripping elements and guide abutments which satisfy this condition, even with the use of suitably synchronized actuators, constitutes a twisting matrix.

If, in the twisting devices of prior art, there is a two-way correspondence between a layer of conductors to be bent and a twisting ring, such a correspondence is lost with the device of the present invention. Indeed, each annular array of twisting conductors may correspond to more than one twisting matrix.

Similarly to the aforesaid inserts, also in this case, a radial actuator 208 is provided, which may comprise a cam mechanism 238 and which can be rotated in relation to a plate of guides with abutments.

In particular, the example of FIG. 14 shows an apparatus comprising:
- an inner twisting matrix 202, with a corresponding cam mechanism 238 positioned between axis X and the gripping element 204;
- a first outer twisting matrix 203, with a corresponding cam mechanism 238, with gripping element 204 positioned between axis X and cam mechanism 238;
- a second outer twisting matrix 303, with a corresponding cam mechanism 238, with gripping element 204 positioned between axis X and cam mechanism 238.

Furthermore, the second outer twisting matrix 303 in FIG. 14 comprises at least one insert 211 (there are three in the example), prepared with its own cam mechanism 238. The insert gripping element 211 and those of the inserts of the first outer matrix constitute an annular array of gripping elements in a starting position, shown in FIG. 14. Therefore, the inserts of the second outer matrix engage a conductor belonging to the same layer as the conductors engaged by the inserts of the first outer matrix 203. The inserts of the first outer matrix 203 have independent movement from that of the inserts of the second outer matrix 303, for the three movement components: radial, circumferential, axial. The inserts of the first outer matrix 203 may:
- rotate differently, in particular in the opposite direction to the rotation of the inserts of the second outer matrix 303;
- move radially and differently, in particular in direction opposite to the radial displacement of the inserts of the second outer matrix 303;
- move axially and differently, in particular in direction opposite to the axial displacement of the inserts of the second outer matrix 303.

In the embodiment of the apparatus just described and in alternative embodiments, groups of independent inserts can be prepared, so as to be able to bend in a differentiated manner one or more sets of conductors (e.g. contiguous) initially positioned on the same layer of conductors. In cases in which the independence of the radial movements of the inserts which model the conductors of the same layer is sufficient, it is sufficient to associate with the independent inserts only a radial actuation dedicated thereto or only shaped slits with shapes dedicated to them within a radial actuator in common to those of other inserts used to bend the conductors of the same layer. The latter embodiment consists of a single matrix of inserts to bend the conductors of the same layer.

Figure 13:
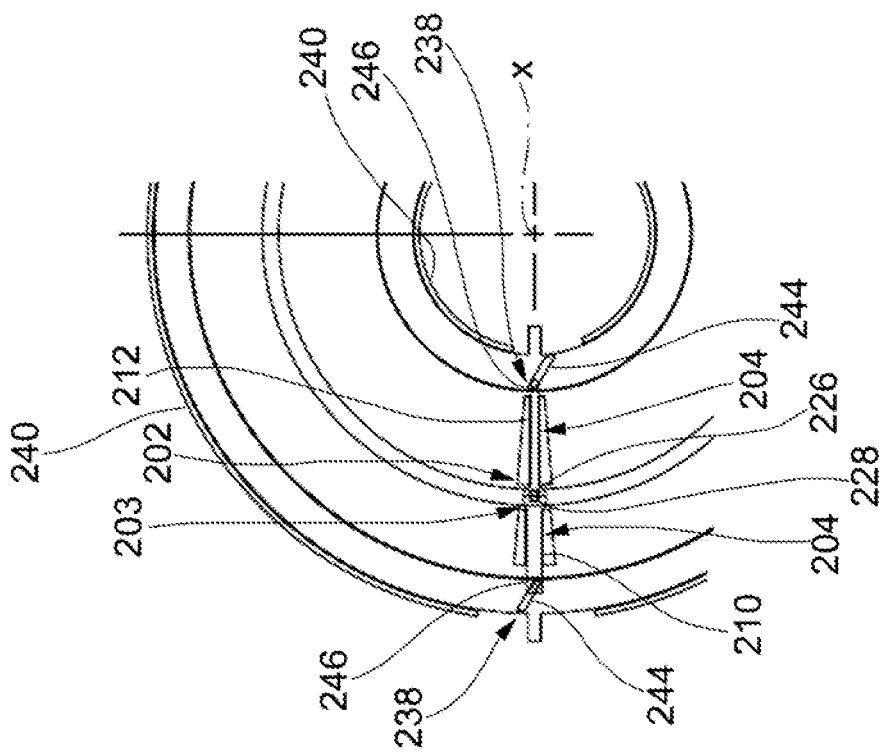
FIG. 13 diagrammatically shows a view from the top of a possible alternative embodiment of the apparatus according to the present invention.
Figure 12:
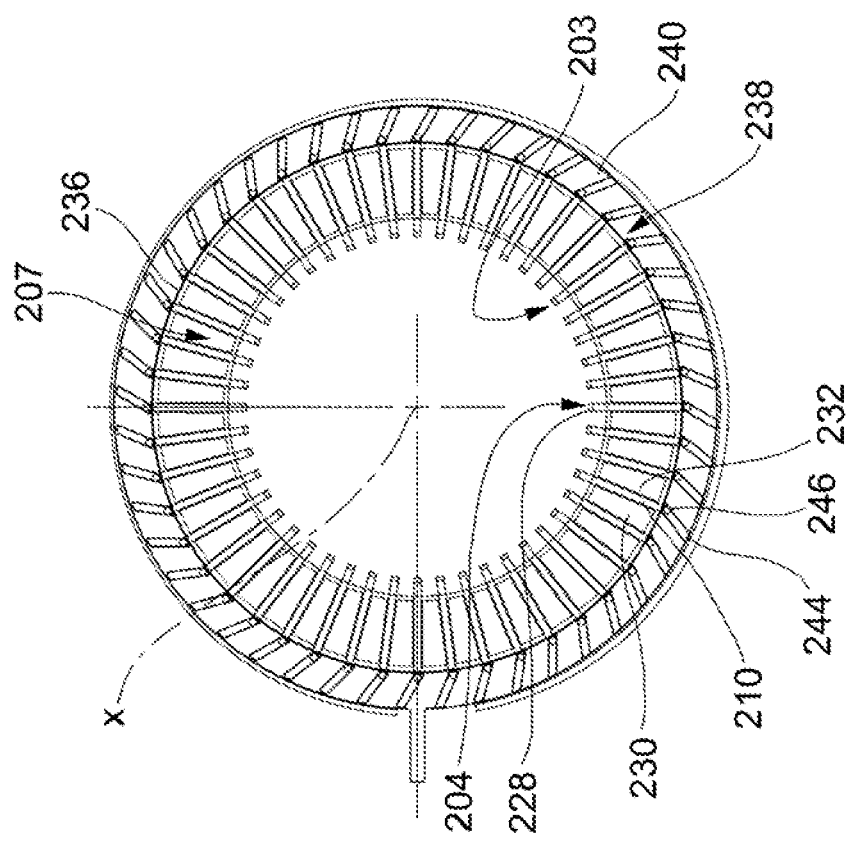
FIG. 12 diagrammatically shows a possible embodiment of the apparatus according to the present invention from the top.

FIG. 13 shows an alternative embodiment of the present invention, in which the outer inserts 212 relative to an outer layer have the first outer portion 218 positioned between the second outer portion 220 and axis X, in a view from the top, and the inner inserts 210 relative to an inner layer have the second inner portion 216 positioned between the first inner portion 214 and axis X, in the same view.

In this case, the system can be provided with an inner cam mechanism 238 for moving at least one inner insert 210, and with an outer cam mechanism 238 for moving at least one outer insert 212. The inner insert 210 may be prepared with the second portion 216 facing inwards.

The length of the first portions 214 and 218 of both inserts can therefore be reduced to a minimum and the space between one layer and the next can be left axially accessible by a ring of insulating material.

According to alternative embodiments, inserts placed on the same layer can be moved in radial direction but with opposite orientation.

Considering the inserts 210, 212 in a first position, and wanting to move them outwards, a relative movement is applied between guide 206, 207 and guide discs 240, 242.

With reference to FIG. 8, for example, in which both the guide 206 and one of the guide discs 242 are visible, guide discs 240, 242 are rotated clockwise, keeping guide 206 stationary. Thereby, the pins 246, 248 are forced to move along the respective slits 244, 245 and in particular towards the second end 252 of the slit itself.

In a possible alternative embodiment, for example, to generate reciprocal movement between guide plates 240, 242 and guide 206, the guide plates 240, 242 can be held in place and the guide 206 can be turned counterclockwise.

In the embodiment shown in FIGS. 4-11, the inner ring 202 and the outer ring 203 consist of inner inserts 210 and outer inserts 212, respectively. Therefore, it is possible to move the inner inserts 210 at the same time, by providing the guide 206 and the respective cam mechanism 238. In the same manner, it is possible to move the outer inserts 212 at the same time, by providing the guide 207 and the respective cam mechanism 238.

In this regard, the radial actuator 208 may comprise moving means 254 adapted to rotate the guide plates 240, 242 with respect to the guide 206, 207.

With reference to FIGS. 5, 6 and 9, it can be noted that each pair of guide discs 240, 242 can be supported by the respective guide 206, 207, so as to be free to rotate on it with respect to axis X. In particular, the guide 206, 207 may be anchored to a support 241, 243, having connection means to axial and tangential actuating sleeves at one end.

According to a possible embodiment, the guide discs 240, 242 may be rotated manually.

With reference to FIGS. 5 and 6, a sleeve 241, 243 is connected to a twisting matrix for aligning its axis with axis X of the apparatus. On said sleeve 241, 243 there is an actuator which confers the rotary and axial motion to said twisting matrix.

With reference to FIG. 4, the moving means 254 may comprise side stops 256, 258, adapted to limit the travel of the guide disc 240, 242 with respect to the guide plate 234, 236.

According to a possible embodiment of the present invention, shown for example in FIG. 8, at least one of the guide discs 240, 242 of each cam mechanism 238, comprises an outward protruding portion 259, according to a radial direction with respect to the outer surface of the guide disc 240, 242 itself. Fixing means 255, 257 of the guide discs 240, 242 to a moving plate 253 are provided on said protruding portion 259. Thereby, the guide plates 240, 242 can be moved by rotating the movement plate 253. According to a possible embodiment of the present invention, the fixing means 255, 257 may be screws or pins, adapted to be inserted in seats 261 provided on said protruding portion 259.

Figure 10:
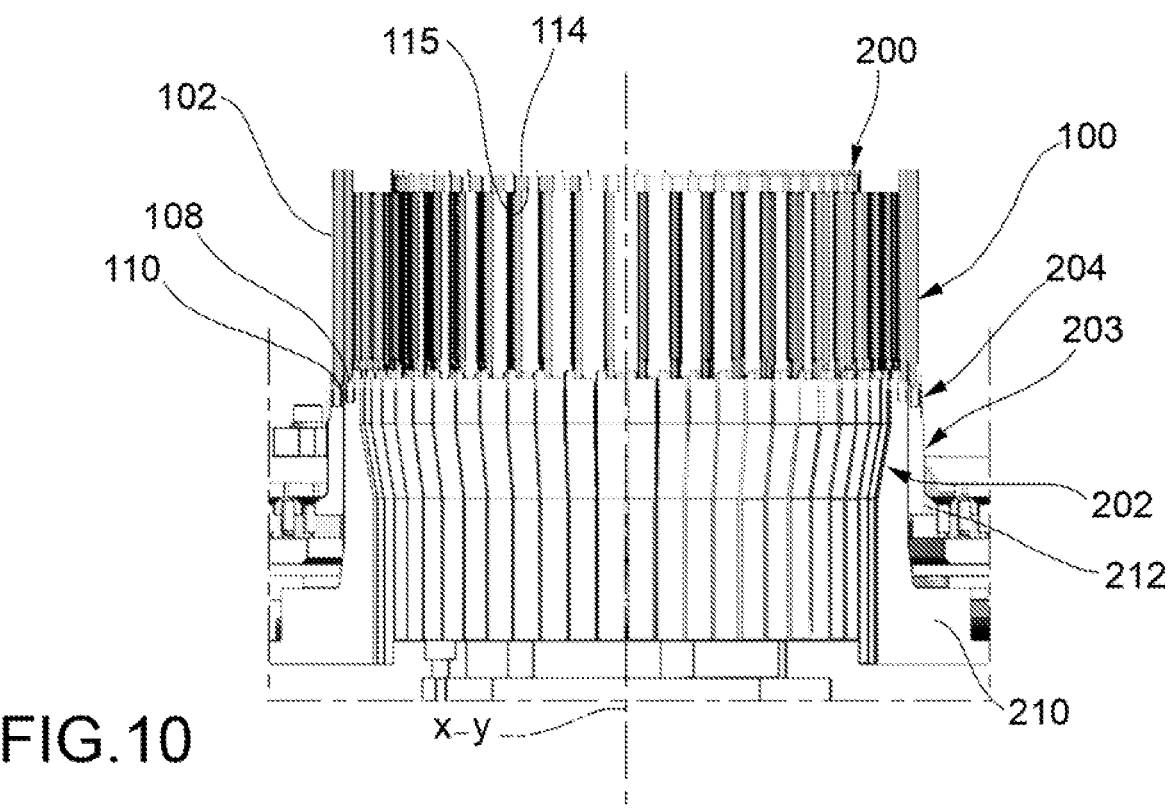
FIGS. 10 and 11 diagrammatically show two steps of the operation of the apparatus shown in FIG. 4 partially in section.
Figure 11:
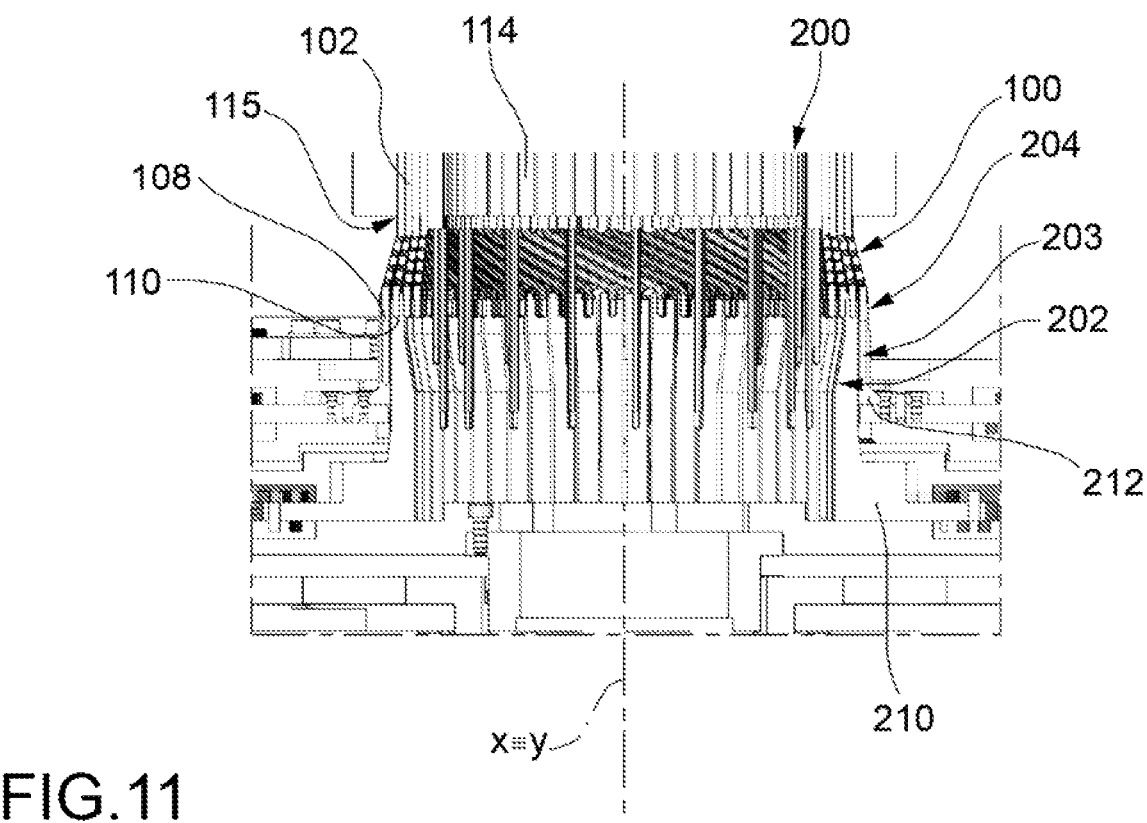

With reference to FIGS. 10 and 11, we will now describe a possible sequence of operations which can be performed on a winding assembly 100, e.g. on welding side.

The inner twisting ring 202 comprises a plurality of inner inserts 210 (one at each free end 108, 110 on such a circumference), and the outer twisting ring 203 comprises a number of outer inserts 212 (one at each free end 108, 110 on such a circumference), which in the initial position are adjacent and placed along the same radial direction in relation to axis X. Said initial position corresponds to the position of the conductor, which must be moved by the insert itself, after its insertion into the stator/rotor and its exiting from the side opposite to that of insertion, before it is subject to any action of deformation of its protruding portion.

In a first step, the free ends are inserted into the seats or cavities 226, 228 present in the inserts 210, 212. In order to facilitate insertion, the inserts may be in a radial position equal to that of the conductors. This step is shown in FIG. 10.

Successively, and preferably without releasing the grip, with reference to FIG. 11, by means of the radial actuation 208 and in particular through the cam mechanism 238, the free ends 108, 110 of the basic conductors 102 are extended outwards through the movement along the radial direction towards the outside of the inner inserts 210 and the outer inserts 212.

From FIG. 11, it can be seen that the free ends 108, 110 subject to gripping move outwards, but remain parallel to each other and in particular with respect to axis X. Subsequently and preferably without releasing the grip on the conductors, because the inner twisting ring 202 and the outer twisting ring 203 can rotate in a relative manner thus performing the twisting e.g. on welding side of the winding assembly 100. During this step, in a manner known per se, the twisting rings 202, 203 accompany the upward movement of the free ends 108, 110, moving in an axial direction (parallel to axis X) towards the stator or the rotor.

In an alternative embodiment, it is possible to firstly twist and then radially deform the free ends 108, 110 without releasing the grip.

In another alternative embodiment, the free ends 108, 110 can be twisted and radially deformed at the same time. According to a possible embodiment of the present invention, the free ends 108, 110 can be deformed towards the inside of the winding, in particular in a radial direction with respect to axis X, i.e. towards the latter.

The process according to the present invention, for deforming conductors of at least one winding assembly 100, protruding from a side of a stator or of a rotor 114 of an electric machine, substantially comprises:
  a step of gripping at least one portion of at least one free end 108, 110 by at least one gripping element 204; and
  a step of releasing the at least one portion of at least one free end 108, 110 by the at least one gripping element 204;
said process comprising, between said steps:
  at least one step of moving in a radial direction with respect to axis X of at least one gripping element 204, causing deflection in radial direction with respect to axis X of at least one free end 108, 110, either towards or away from said axis X; and
  at least one step of moving in circumferential direction of at least one gripping element 204, thus causing the deformation in circumferential direction with respect to axis X of said at least one free end 108, 110.

The process may comprise an initial step in which an apparatus 200 is provided for the deformation steps described above of conductors protruding from one side of a stator or rotor of an electric machine of the type described above.

Furthermore, according to a possible embodiment of the process according to the present invention, the movement in radial direction can be performed before, after or at the same time as the step of movement in circumferential direction of the welding side.

According to a possible embodiment of the present invention, the process according to the present invention comprises a step of moving in axial direction of at least one gripping element 204, towards the winding assembly 100, at the same time as the step of circumferential moving.

In a possible alternative embodiment, such a step of axial moving may not be present. In this case, the conductor may be stretched.

The contemporaneity of two or more of the described steps implies that the gripping element moves according to a trajectory resulting from the composition of the motion components associated with the single contemporary steps. For example, in a cylindrical coordinate system r, z, θ centered on rotation axis X of the twisting matrix, if the step of radial displacement of a gripping element defined by the time law r(t)+r0, depending on the time t, is simultaneous with the step of circumferential θ displacement (t)+θ0 of the same gripping element, the time law of said gripping element is obtained as the set of coordinates r(t)+r0, z0, θ(t)+θ0, r0, z0 and θ0 being the coordinates of the initial position.

The gripping elements placed on inserts belonging to the same apparatus and in particular guided by the same plate of guides and actuated by equal shaped and sized cam slits, have substantially overlapping trajectories. Indeed, in this case, the trajectory of the i-th gripping element is r(t)+r0i, z(t)+z0i, θ(t)+θ0i, where r0i, z0i, θ0i represent the coordinates of the initial position. The trajectories can be superimposed when each one is referred to the initial position of the respective element, i.e. by eliminating the terms r0i, z0i, θ0i, they are all defined by the triad of coordinates r(t), z(t), θ(t).

The process may also comprise a step of centering the winding assembly 100 and stator 114 with respect to axis X of the apparatus 200.

It is therefore apparent that the winding assembly 100 may be deformed as a result of successive or simultaneous movements of the free ends 108, 110 which comprise:
  a movement according to a circumferential direction with respect to axis X;
  movement according to a radial direction in relation to axis X;
  movement in axial direction in relation to axis X; and
  a rotation of the cross section of the free end 108, 110 with respect to an end axis Z, parallel to axis X.

Figure 16:
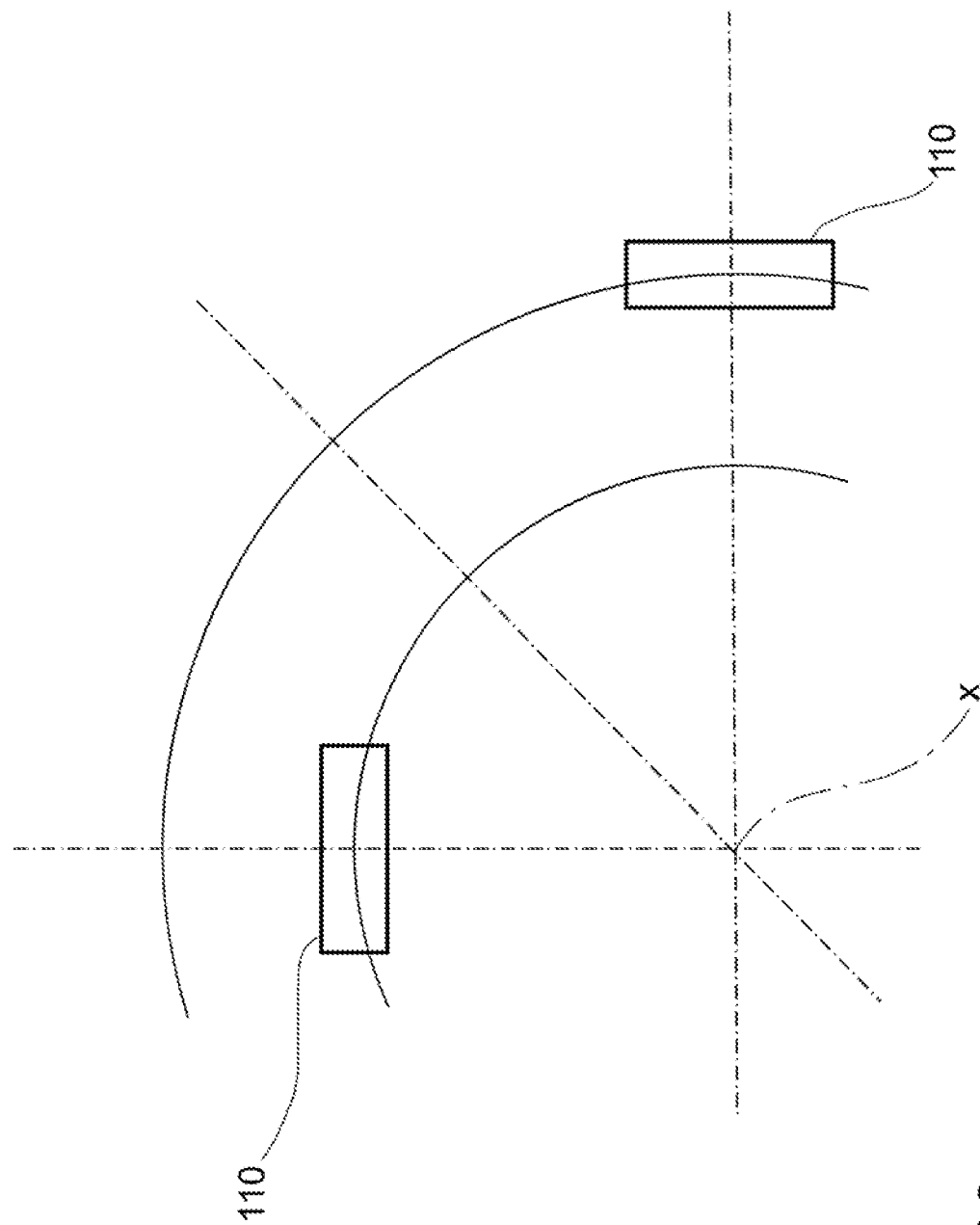
FIG. 16 is a diagrammatic view of a possible method of operation of an apparatus according to the present invention.

The rotation of the section of the free end 108, 110 is due to the shape coupling between the gripping element 204 and the outer surface of the free end 108, 110. During deformation due to circumferential movement, the cross section of the free end 108, 110 follows the movement of the gripping element 204, thus changing its position on the plane perpendicular to axis X, but maintaining its orientation with respect to the radial direction, as shown in the example in FIG. 16.

In particular, the inner side of the cross section may remain advantageously tangential to the circumferential direction, so that a free end on a different layer can be welded through the surface adjacent and parallel to that of the first layer.

According to a possible embodiment, the free end in its final form, at the end of the deformation process, is placed at a predetermined axial distance from the stator or rotor, substantially the same as that of most of the ends protruding from the side of stator or rotor to which it belongs.

An end portion protruding from one side of a winding may be deformed at the same time or at different time intervals from other ends, so that predetermined distance values can be assigned between the fixed part, constrained by the slot, and the deformed end of the conductor.

Once the ends of a winding protruding from one side of the stator are divided into sets defined by the layers of which the winding is composed, i.e. sets of ends protruding from the same radial position of the slot, the method described hereto can be applied to:
  a) bending said ends along equal trajectories, i.e. with the same radial, circumferential and axial components (uniform twisting), between the different conductors of at least one of said layers;
  b) bending end subassemblies of the same layer in accordance with equal trajectories between the different ends of a subassembly, i.e. with the same radial, circumferential and axial components, between the ends of a subassembly of a layer.

In the case of conductors in the same slot position, they can all take the same distance between a cross section which has remained fixed and the extreme portion of the deformed conductor. Advantageously, at least one of the conductors can be deformed differently, i.e. according to a different trajectory.

In light of the detailed description which has just outlined, the advantages which can be achieved with an apparatus and a process according to the present invention are apparent.

In particular, an apparatus and a process have been provided which allow the free ends to be separated from one another so that they can be easily welded together.

In particular, with the apparatus and the process according to the present invention, it is possible to radially deform the free ends in order to facilitate the welding process. Furthermore, by spreading the winding and being able to decide the distance between the terminals, it is possible to increase the space in the radial direction, thus facilitating the welding process and improving the insulation.

Again, if a plurality of conductors in the same stator or rotor slot is provided, it is possible to achieve an initial separation in the radial direction between the conductors, through a radial movement of the inserts, and then proceed to the actual twisting of the winding. Such an extension allows each insert to be aligned with the corresponding conductor, making it easier to insert the conductor into the insert pocket. This advantage is particularly felt in the case of windings with many conductors stacked radially in the slot. Indeed, in these cases and in absence of the device of the present invention, the twisting performed by means of devices of prior art must be preceded by a step of radially positioning the conductors aligned with the pockets of the traditional twisting machine, operated by a third device. Furthermore, the radial distance between the free ends allows the insertion of insulating rings between the layers of the same set, even before the circumferential bending of the ends of the conductors, to the benefit of the integrity of the winding insulation.

Furthermore, the process allows the free ends of each protruding conductor to be positioned in a radial position different from that defined in the slot. This allows, for example, the direct connection of two adjacent sets by directly connecting two conductors placed on non-adjacent layers of the two sets themselves.

Furthermore, an apparatus has been provided which can be easily used to prevent electrical arcing between close ends.

In the embodiments described above, those skilled in the art will be able to make changes and or substitutions of elements described with equivalent elements without departing from the scope of the appended claims in order to meet specific requirements.

For example, the same concepts as above can also be applied to the winding insertion side, e.g. in the case of I-pin and conductors welded on both sides.

LIST OF REFERENCES IN THE DRAWINGS 100 winding assembly
102 basic conductor
104 leg
106 leg
108 free end/terminal
110 free end/terminal
112 connecting portion
114 stator or rotor
115 cavity
200 apparatus
202 inner twisting ring
203 outer twisting ring
204 gripping element
206 inner guide below
207 outer guide above
208 radial actuator
210 inner insert
211 independent insert
212 outer insert
214 inner insert first portion
216 inner insert second portion
218 outer insert first portion
220 outer insert second portion
222 upper inner end
224 upper outer end
226 inner seat
228 outer seat
230 side reference
232 side reference
234 inner plate
236 outer plate
238 cam mechanism
240 lower guide disc
241 support
242 upper guide disc
243 support
244 lower shaped slit
245 upper shaped slit
246 lower pin
248 upper pin
250 inner first end
252 outer second end
253 moving plate
254 moving means
255 fixing means
256 side stop
257 fixing means
258 side stop
259 protruding portion
261 fixing means seat

The invention claimed is:
1. An apparatus for deforming conductors of at least one winding assembly, protruding from a side of a stator or of a rotor of an electric machine, said at least one winding assembly comprising a plurality of basic conductors comprising at least one leg inserted in a cavity of stator or of rotor, each having at least one respective free or terminal end; said apparatus comprising at least one twisting matrix, adapted to rotate about an axis (X), comprising at least one gripping element adapted to grip at least one free end and adapted to be moved in a radial direction with respect to said axis (X) to deform said at least one leg such that said at least one free end is closer to or further away from the axis (X); said gripping element is provided on an insert having "L" shape on a transverse plane comprising the axis (X); said apparatus comprising at least one guide adapted to guide the at least one gripping element along the radial direction with respect to the axis (X); and a radial actuator, adapted to actuate the at least one gripping element along the radial direction with respect to the axis (X).

2. The apparatus according to claim 1, characterized in that the gripping element comprises a seat or slot having an extension substantially parallel to the direction of the axis (X).

3. The apparatus according to claim 1, characterized in that said at least one gripping element is adapted to move in an axial direction parallel to the axis (X).

4. The apparatus according to claim 1, characterized in that said at least one guide is anchored to a sleeve, said sleeve adapted to be connected to said radial actuator, adapted to transmit a rotation motion with respect to the axis (X) to a translation motion along the direction of the axis (X).

5. The apparatus according to claim 1, characterized in that the gripping elements of said at least one twisting matrix are adapted to be moved radially.

6. The apparatus according to claim 1, characterized in that said at least one gripping element is adapted to be moved radially with respect to the axis (X), towards and away from said axis (X).

7. The apparatus according to claim 1, wherein said at least one gripping element comprises a plurality of gripping elements, said at least one guide comprising a plurality of guides, and wherein said radial actuator is one of a plurality of radial actuators, said apparatus comprising an inner twisting matrix and an outer twisting matrix, both provided with at least one of said gripping elements movable radially with respect to the axis (X), said apparatus comprising an assembly of at least one of said guides and one of said radial actuators dedicated to each twisting matrix.

8. The apparatus according to claim 1, wherein said at least one gripping element comprises a plurality of gripping elements, said at least one guide comprising a plurality of guides, and wherein said radial actuator is one of a plurality of radial actuators, said apparatus comprising a plurality of twisting matrixes, each formed by at least one of said gripping elements movable radially with respect to the axis (X), said apparatus comprising an assembly of at least one of said guides and one of said radial actuators dedicated to each twisting matrix.

9. The apparatus according to claim 1, characterized in that the actuator comprises a cam mechanism for moving at least one insert on which said at least one gripping element is provided, said cam mechanism comprising at least one guide disc lying in a plane perpendicular to the axis (X), and provided with at least one shaped slit having a first end arranged at a first distance with respect to the axis (X), and a second end arranged at a second distance with respect to the axis (X) which is greater than the first distance.

10. The apparatus according to claim 9, characterized in that said insert comprises:
a first portion substantially parallel to the axis (X), and
a second portion substantially perpendicular to the axis (X);
said first portion being provided at an upper end, with said gripping element, said second portion being provided with at least one pin.

11. The apparatus according to claim 10, characterized in that the cam mechanism comprises a lower guide disc and an upper guide disc each lying in a plane perpendicular to the axis (X) and spaced apart from each other, said second portion of each insert being at least partially contained between said lower guide disc and said upper guide disc so that the respective pin is contained in a shaped slit.

12. The apparatus according to claim 9, wherein said at least one gripping element comprises a plurality of gripping elements, said at least one guide comprising a plurality of guides, and wherein said radial actuator is one of a plurality of radial actuators, said apparatus comprising an inner twisting matrix provided with inner inserts and an outer twisting matrix provided with outer inserts, said inner inserts and said outer inserts being provided with dedicated cam mechanisms.

13. The apparatus according to claim 9, characterized in that the cam mechanism is positioned between the at least one gripping element and the axis (X), or externally to the gripping element so that the gripping element is positioned between the axis (X) and the cam mechanism.

14. The apparatus according to claim 1, characterized in that the at least one twisting matrix is provided with at least one independent gripping element and a radial actuator dedicated thereto.

15. The apparatus according to claim 9, characterized in that said first and second ends are on two different radii with respect to the axis (X), said cam mechanism further comprising at least one pin protruding according to a direction parallel to the axis (X) from a portion of the insert adapted to slide in said at least one shaped slit according to a direction belonging to a plane perpendicular to the axis (X).

* * * * *